METER MOUNT

Filed July 26, 1962 3 Sheets-Sheet 1

INVENTOR
HERMAN H. KOBRYNER
BY Hopgood and Calimafde
ATTORNEYS.

FIG. 2.
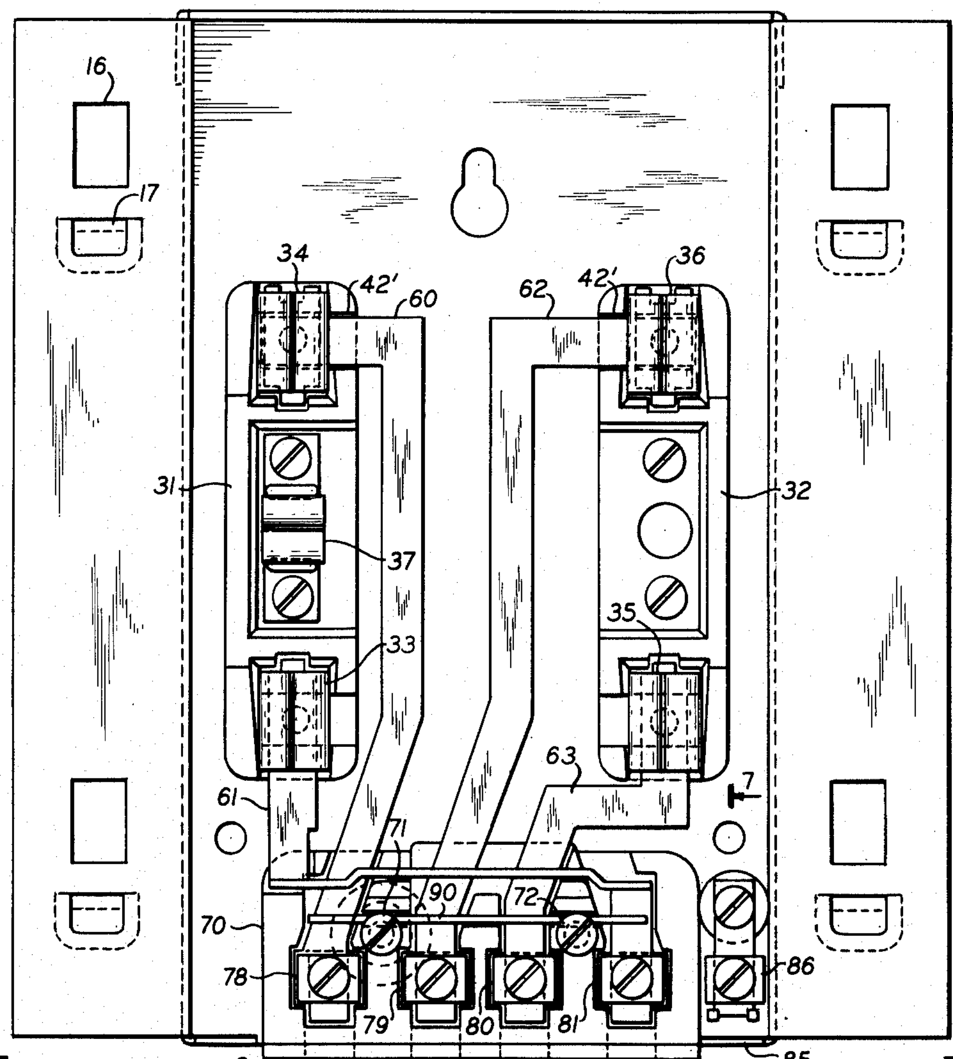
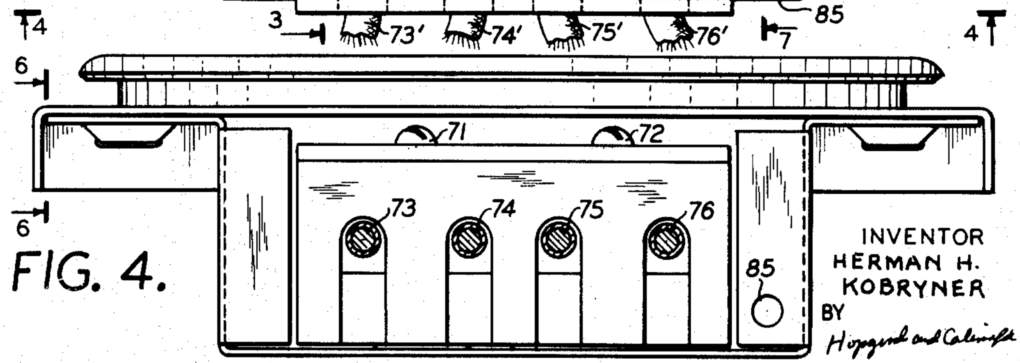
FIG. 4.
INVENTOR
HERMAN H. KOBRYNER
BY
Hopgood and Calimafde
ATTORNEYS Nov. 30, 1965 H. H. KOBRYNER 3,221,216
METER MOUNT
Filed July 26, 1962 3 Sheets-Sheet 3
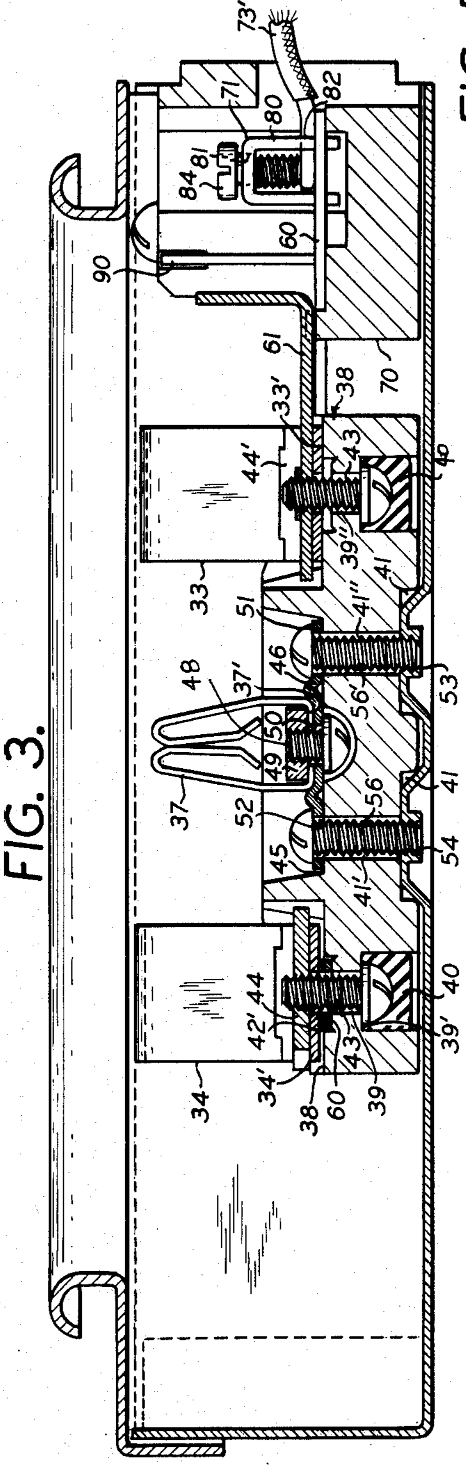
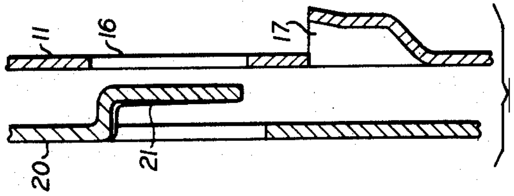
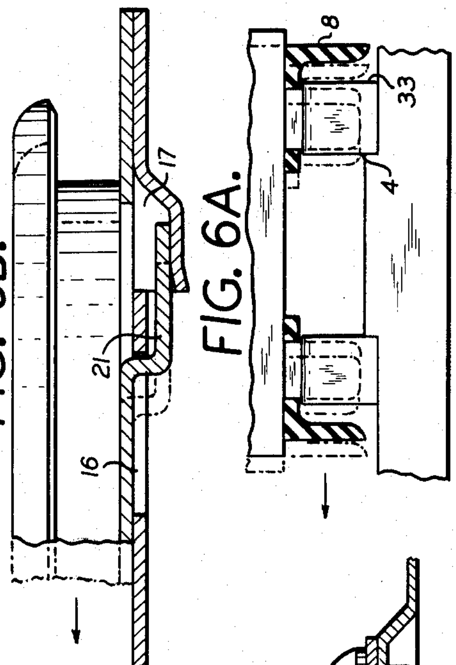
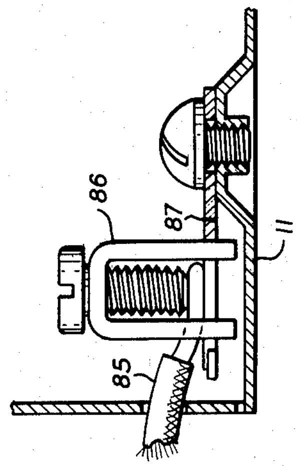
INVENTOR
HERMAN H. KOBRYNER
BY Hopgood and Calimafde
ATTORNEYS.

United States Patent Office 3,221,216
Patented Nov. 30, 1965

3,221,216

METER MOUNT

Herman H. Kobryner, Forest Hills, N.Y., assignor to Murray Manufacturing Corporation, Brooklyn, N.Y., a corporation of New York Filed July 26, 1962, Ser. No. 212,510
6 Claims. (Cl. 317—104)

My invention relates to an improved meter mount for use with metering devices of the plug-in type.

More particularly, my invention relates to a unique and shallow meter mount which comprises flat busses and which eliminates the usual connectors for bus connection to the meter engaging jaws. My invention also features a unique locking arrangement between the box and cover of the mount.

Present day meter mounting devices generally fall into one of two categories. The device of the first category comprises two boxes coupled together and having a common opening for passing wires from one box into the other. The boxes are positioned one above the other; the upper one being adapted to receive the meter and the lower one the terminal block. The upper box opening is provided with a flange which serves as a seat for the meter and also as a catch for the meter sealing ring. This meter receiving box contains the conventional insulating blocks for mounting the meter engaging jaws and terminal connectors located closely to the jaws.

The lower box contains the terminal block in which each bus has two connectors; one for connecting a wire to a corresponding connector in the upper box and the other for connection to a service main. The lower box is closed by a cover secured by a screw and is sealable. The upper box is closed by the meter and is sealed by the meter ring seal.

The device of the second category comprises a single box. The upper portion of the box is for the meter and contains mounting blocks for the jaws and terminal connectors, as in the upper box of the first category. The lower portion of the box contains the terminal block, also as in the lower box of the first category, and the connections between the upper and lower connectors are also made as above described.

The box is closed by a cover having a round opening. The opening is provided with a rim to seat the meter and to be engaged by the sealing ring. The cover is secured to the box by screws, bolts and nuts, or a latch accessible only through the round opening prior to the attachment of the meter.

The device of the second category has several advantages. For example, it requires only one seal as opposed to two required by the first type. Further, it is less expensive to manufacture as it requires fewer parts, and connections are easier to make in one open box, as opposed to feeding wires through an opening between the boxes.

Although the second type of box has advantages, considerable effort has been made to simplify the interconnections and reduce the number of parts, if possible. The industry has also been striving for a box which is smaller in all dimensions, and particularly in depth, than the conventional box.

Accordingly, it is a first object of this invention to provide a meter mount which requires fewer parts than the second type meter mounting device, is simpler to manufacture and assemble, and utilizes standarized parts, thereby lending itself to mass production techniques.

It is further object of this invention to provide a meter mount which is uniquely constructed so as to permit conductor fittings to be connected directly to the jaws, thereby eliminating the intermediate jaw connectors and permitting the box to be made smaller and more shallow.

It is still another object of the invention to provide flat, stamped conductive fittings which are integral with and part of the terminal block connectors. The fittings are stiff and uniquely shaped to extend between the terminal block and jaws, thereby eliminating the usual connecting wire and the labor of forming and connecting it. Furthermore, by eliminating the connecting wire and the pressure connectors, which are usually heat generators, the cross-sections of the fittings may be reduced thereby requiring less material and reducing cost.

It is another object of the invention to provide a cover-box locking arrangement which requires no screws, bolts or difficult to reach latches, but which utilizes the meter as part of the locking mechanism.

It is another object of the invention to provide a meter mount containing stamped, rigid conductive fittings which are appropriately spaced and used without insulation covering. The stamped, uninsulated fittings in combination with insulating blocks suitably located, permit a box which is shorter, narrower and shallower than the conventional box in which connections are made by flexible wiring.

It is another object of the invention to provide a meter mount which may be used as an adapter when it is desired to replace an "A" type base meter with the standard plug-in type. To serve this purpose, the novel meter mount comprises a terminal block at the lower part thereof whose connector sequence and spacing are similar to the "A" type meter mount. Further, the "A" type meter is often located on the surface of a wall and it is desired to limit the protuberance. In accordance with the invention, the novel mount adapter is less of a protuberance than the replaced mount as it is more shallow and compact.

It is yet another object of the invention to mount a fifth jaw assembly between respective jaws on one jaw block by means of the same screws which hold the jaw block to the box. In this case these screws perform additional functions, as bonding the fifth jaw electrically to the box and, when required, clamping a wire leading to a connector on the terminal block.

Still another object is to provide an improved modular meter mount in which the shapes of the preformed busses are standardized so that only a relatively few are required in order to adapt the meter mount to the many types of meters in use.

Briefly, my invention comprises a relatively shallow rectangular shaped box having sets of insulative jaw blocks mounted by screws thereto. An insulative terminal block for the line and load conductors is mounted in the lower portion of the box. Preformed, stiff busses, such as sheet copper stampings connect the terminals of the terminal to the respective jaws. The busses are sufficiently stiff or rigid to secure the spacing between them without the need of additional insulation. Each bus is clamped directly to the base of a respective jaw by suitable screws and nuts which eliminates the use of a pressure connector for each jaw as is required by the conventional mounts. Further, the uniquely shaped busses also serve as the base fitting for each pressure connector in the terminal block, thereby again reducing the number of parts required.

In accordance with an aspect of my invention I provide a meter box having flanges extending from two sides and parallel to the bottom of the box. The box cover also has flanges extending from its sides which are complementary to the box flanges. The cover is provided with a central opening to receive the meter, which is provided with an annular receiving rim. A conventional clamping ring element is utilized to fasten the meter to the cover. The meter base is provided with contact blades which are received by the jaws. Each blade has an associated insulative shield mounted or spaced a predetermined small distance from its respective blade. The box cover is locked to the box by means of finger members on the cover fitting into slots provided in the box flanges. When the cover is slid over the box, the fingers slide into the slots. The fingers are locked or are in mating relationship with the slots for a distance at least equal to a distance from the insulative shield to the contact blade. When the fingers mate with the slots, the meter opening is aligned with the jaws, thereby the meter may be inserted. The clamping ring then secures the meter to the cover. The meter, cover and box are then locked because the meter (and the cover) may be moved with respect to the box only until the insulative shields are stopped by their associated jaws, in which case, the fingers remain locked in the slots. Thus, a component of the meter prevents the mating finger from moving out of its associated slot.

The above mentioned and other features and objects of this invention and the manner of attaining them will become more apparent and the invention itself will be best understood by reference to the following description of an embodiment of the invention taken in conjunction with the accompanying drawing, wherein:

FIGURE 2 is a top view along the plane of the line 2—2 of FIGURE 1;

FIGURE 3 is a side view along the plane of the line 3—3 of FIGURE 2;

FIGURE 4 is a front view along the plane of the line 4—4 of FIGURE 2 with the box covered;

FIGURE 5 is a side view of the locking elements of the box and cover;

FIGURE 6A is a sectional view along the plane of 6—6 of FIGURE 4 showing the box and cover in locked position;

FIGURE 6B is a fragmentary sectional view showing the position of the meter blades and shields for the corresponding position shown in FIGURE 6A;

FIGURE 7 is a sectional view along the plane of 7—7 of FIGURE 2.

Figure 1:
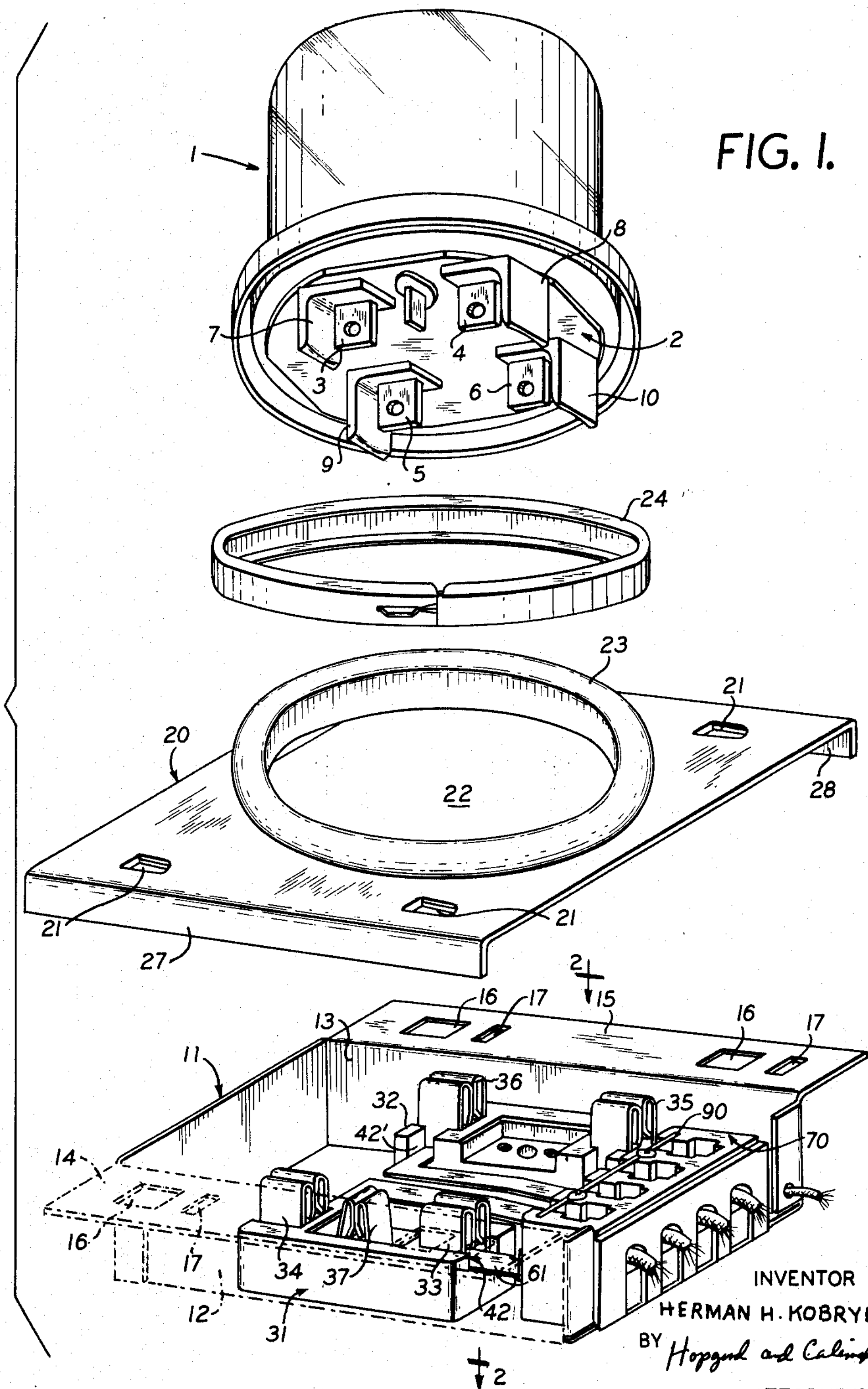
FIGURE 1 is an exploded perspective view showing the assembly of the meter, box, cover and clamping ring.

Referring now to FIGURE 1, there is shown a conventional meter 1 having a base 2 to which contact blades 3–6 are secured. Insulative shields 7–10 are mounted to the base and are conventionally spaced from associated blades by a small distance. Shields 7–10 perform their usual function of preventing the blades 3–6 from hitting parts of a meter mount when the meter is inserted; however, in accordance with one aspect of the invention, the shields perform an additional and unique function of retaining the box and cover in locked position and which eliminates the necessity of using an additional cover lock, as will be apparent later.

The meter mount comprises a box 11 and a cover 20. Box 11 is rectangularly shaped and is shallow relative to prior meter mount boxes. The sides 12 and 13 have flanges 14 and 15 extending outwardly from their edges respectively in a direction or plane parallel to the bottom of the box. Each flange has two slots 16 (FIGURES 5, 6B) and two pockets 17 respectively, which receive fingers 21 extending downwardly from cover 20.

Cover 20 has a round central opening 22 and a rim 23 which serves as a seat for the meter and a catch for the meter sealing ring 24. Flanges 27 and 28 form the sides of the cover and fit over the edges of box flanges 14 and 15 and prevent unauthorized penetration into the box, for instance, by prying a blade between the flange of the box and cover. Further, the flanges serve to guide the cover when applied to the box.

Clamping ring 24 is conventional, the sides of which clamp the meter rim against the seating rim of the cover. Ring 24 is sealed to prevent tampering.

Referring to FIGURES 1 and 2, there are shown jaw insulator blocks 31 and 32 mounted in box 11 and having secured thereto, a plurality of meter blade receiving jaws 33–36 whose spacing is the same as the blades 3–6 of the meter. Jaws 33 and 34 are mounted on the front and rear ends respectively of jaw block 31 and jaws 35 and 36 are mounted on the front and rear ends respectively of jaw block 32. When an additional jaw is required, a fifth jaw 37 may be secured to jaw block 31 between jaws 33 and 34 having its clamping surfaces perpendicular to those of the other jaws. The fifth jaw 37 is generally used as a neutral connection and may be conveniently connected to an external neutral lead-in wire. Each jaw has a base, and side portions defining a resilient clasp or clip for effectively gripping a meter blade. In accordance with another aspect of the invention, the base of each jaw contacts directly respective ends of busses 60–63. The opposite ends of the busses are located in appropriate terminal positions in the terminal block 70 and form part of the terminal connections as will be described later.

The jaw blocks may be formed from porcelain or other suitable material. Jaw block 31 has front and rear cavities molded therein to receive the front and rear jaws 33 and 34 respectively. Jaw block 31 has a front longitudinal recess or channel 42 (FIGURE 1) to accommodate bus 61 and a rear transverse recess or channel 42' to accommodate bus 60. If desired, both ends of a jaw block may have longitudinal and transverse channels. Jaw block 32 is identical to jaw block 31 and has similar channels 42 and 42' to accommodate respective busses.

The jaw blocks have decks 38 (FIGURE 3) on which the bases of the jaws rest. A screw hole 39 passes through a surface 39' of a recess 40 formed in the bottom of the jaw block and passes through deck surfaces 38. Two shallower recesses 41 are formed intermediate recesses 40 and have screw holes 41' passing therethrough to a corresponding deck 45 on which the netural jaw 37 rests.

The base 34' of jaw 34 is seated on the deck 38. Channel 42' runs through deck 38 so as to accommodate the end of bus 60. Thus, the jaw base 34' and the end of bus 60 are in direct physical contact. A screw 43 passes through screw hole 39 and openings in the bus 60 and base 34', and is threaded into a nut 44 which secures the entire assembly.

The end of bus 61 (FIGURES 1 and 2) passes between the side of jaws 33 and is located on the top of base 33' which is mounted directly on deck 38. A screw 43 passes through a screw hole 39'' and is threaded into nut 44' which secures the entire assembly. In view of the shallowness of the box, recesses 40 and 41 are shallow and are preferably filled with an insulative compound after the screws are fixed in position.

A clamping plate or fitting 46 is seated on the deck 45. The base 37' of jaw 37 is clamped to the fitting 46 by a screw 48 and nut 49. Fitting 46 has an aperture 50 to receive the screw 48 as well as apertures 51 and 52 on opposite sides of aperture 50. Aligned threaded apertures 53 and 54 are formed in the bottom of the box 11. Screws 56, 56' pass through respective apertures 51 and 52, holes 41' and 41'', and threaded apertures 53 and 54 to clamp the jaw block to the box as well as clamping the entire fifth jaw assembly to the jaw block.

*Terminal block*

An insulative terminal block 70 (FIGURES 2 and 4) which preferably may also be formed from porcelain is mounted within box 11 in the lower end thereof and fastened by bolts 71 and 72 to the box rear wall. Block 71 has openings 73–76 to receive line and load conductors 73'–76'. Each of the openings 73–76 has associated pressure connectors 78–81 which are identical and which receive the lead-ins from conductors 73'–76' as well as prespective ends of stiff busses 60–63. The fastening of the lead-in and the bus to a pressure connector is shown in FIGURE 3.

The pressure connector comprises an inverted U-shaped element 80 having a threaded aperture 81 in the transverse part. An opening 82 is formed in the legs through which the lead-in from conductor 73' passes. The opening in the other leg is shaped to accommodate an end of stiff bus 60 to pass therethrough and also through opening 82. Screw 84 when tightened presses the lead-in of wire 73' against the stiff bus 60. The pressure connectors 78–81 do not require a base plate or fitting to provide support for the pressure supplied by the pressure screw since the ends of stiff busses 60–63 serve this purpose.

An opening 85 (FIGURE 4) is provided in the box 11 to receive the lead-in of a ground wire. Since the ground wire may be connected internally to the box 11, a conventional pressure connector 86 (FIGURE 7) is mounted within the box. This pressure connector comprises a U-shaped fitting and pressure screw, and a conventional clamping or base plate 87. Clamping plate 87 is secured to the box 11 by a screw which grounds the entire box.

Each of the busses 60–63 are stiff and rigid. The bus material as well as the width and thickness account for such stiffness and rigidity. Preferably, and conveniently, such busses may be stamped from sheet copper in various sizes and shapes to accommodate various wiring arrangements. An insulator 90 mounted in the terminal block helps to position the ends of busses 60–63 in spaced apart relationship.

*Locking action*

The construction described above in which the terminal block is positioned within the meter box and the cover of both, form a single compact unit. Before the meter is inserted, the cover 20 is placed over box 11 so that the fingers 21 are received in slots 16 and the cover is slid in the direction to which the fingers point (FIGURES 5 and 6B). Unless this is done, opening 22 in the cover 20 will not be properly aligned and the insulative shields 7–10 will hit the jaws. When the cover is properly aligned, the fingers will be received and tightly clamped by pockets 17. As best seen in FIGURE 6B, the fingers are formed so as to scrape against the pocket upon insertion. The scraping action removes the paint from the contacting surfaces thereby effecting a grounding connection between the cover and box. Once the blades are received in the jaws, the cover and meter may slide or play relative to the box for a distance equal only to the space between the meter blade and the blade shield, which is negligible. However, in accordance with another aspect of my invention, in order to remove the cover 20 from the box 11, the meter must first be removed, and the cover may be slipped off without the insertion of fingers or tools inside the box to perform an unlatching operation. And, when the meter is in position, it positively prevents the cover from being removed from the box.

While a finger and slot has been shown, other mating arrangements using male and female members on the box or cover may be utilized, such as a button-key hole arrangement. The finger-slot-pocket arrangement has certain unique attributes since each element thereof may be formed by a simple stamping arrangement, without using an additional part.

It is evident that my meter mount box may be made of various sizes. Further, by using only a few preshaped stiff busses, I may vary the wiring arrangement so that the meter mount device is substantially universal. While providing a shallow yet universal box, I still provide an effective lock which can be opened safely and readily by an electrician, and yet is effectively locked unless the meter is removed.

While the foregoing description sets forth the principles of the invention in connection with specific apparatus, it is to be understood that this description is made only by way of example and not as a limitation of the scope of the invention as set forth in the objects thereof and in the accompanying claims.

I claim:

1. A mounting device for a meter of the type having a plurality of contact blades, each having a laterally spaced insulator extending from the base thereof comprising: a box; a cover mountable on said box and having an aperture therethrough for receiving said meter contact blades and insulators; locking means comprising corresponding mating elements located upon said cover and box, respectively, and engaging during a predetermined lateral displacement of said cover relative said box; contact jaws within said box for corresponding longitudinal engagement with said blades, said jaws being disposed therein to cooperate with said insulators and maintain said cover within said predetermined lateral displacement when said meter is mounted thereon; and means for fastening the meter to said cover.

2. The mounting device claimed in claim 1 in which said locking means are disposed upon respective cover and box flanges and comprise: a plurality of similarly faced fingers, each disposed on one of said cover and box flanges to run parallel therewith, for mating with a corresponding plurality of apertures located in the other of said cover and box flanges.

3. The mounting device claimed in claim 2 further comprising frictional means adjacent each aperture for engaging the associated mating finger.

4. The mounting device claimed in claim 3 in which the fingers and frictional means are lanced from their associated flanges.

5. The mounting device claimed in claim 1 further comprising a plurality of terminals mounted in said box for receiving and securing input conductors, and preformed stiff conductors each coupling one of said terminals to one of said contact jaws.

6. The combination of: a meter having a plurality of contact blades, each having a laterally spaced insulator extending from the base; a box; a cover removably mounted on said box and having an aperture therethrough for receiving said contact blades and insulators; locking means comprising corresponding mating elements located upon said cover and box, respectively, and engaging during a predetermined lateral displacement of said cover relative said box; contact jaws within said box for corresponding longitudinal engagement with said blades, said jaws being disposed therein to cooperate with said insulators and maintain said cover within said predetermined lateral displacement when said meter is mounted thereon; and means for fastening the meter to said cover.

References Cited by the Examiner

UNITED STATES PATENTS

| | | | |
|---|---|---|---|
| 1,048,896 | 12/1912 | Schmitt | 317—110 |
| 2,105,396 | 1/1938 | Bakke | 317—107 |
| 2,819,358 | 1/1958 | Waldrop | 200—51.1 |

JOHN F. BURNS, *Primary Examiner.*

DARRELL L. CLAY, *Examiner.*